United States Patent [19]
Klein et al.

[11] Patent Number: 6,138,194
[45] Date of Patent: Oct. 24, 2000

[54] APPARATUS FOR SENSING MOVEMENT OF A BUS CARD AND AUTOMATICALLY REMOVING POWER FROM THE BUS CARD

[75] Inventors: Dean A. Klein, Eagle; Hoyt A. Fleming, III, Boise, both of Id.

[73] Assignee: Micron Electronics, Inc., Nampa, Id.

[21] Appl. No.: 09/093,654

[22] Filed: Jun. 8, 1998

[51] Int. Cl.[7] ................................................. G06F 13/00
[52] U.S. Cl. ........................... 710/103; 710/102; 710/10; 710/129; 713/340; 361/686
[58] Field of Search .................... 710/8, 10, 11, 710/15, 16–18, 62, 63, 101–103, 129; 713/340; 307/140, 147; 361/686, 58

[56] References Cited

U.S. PATENT DOCUMENTS

| | | | |
|---|---|---|---|
| 4,396,882 | 8/1983 | Kellenbenz | 323/728 |
| 4,747,783 | 5/1988 | Bellamy et al. | 439/59 |
| 4,999,787 | 3/1991 | McNally et al. | 364/514 |
| 5,157,771 | 10/1992 | Losi et al. | 395/325 |
| 5,210,855 | 5/1993 | Bartol | 395/500 |
| 5,317,697 | 5/1994 | Husak et al. | 395/325 |
| 5,386,567 | 1/1995 | Lien et al. | 710/103 |
| 5,473,499 | 12/1995 | Weir | 361/58 |
| 5,530,302 | 6/1996 | Hamre et al. | 307/147 |
| 5,568,610 | 8/1996 | Brown | 395/185.01 |
| 5,625,238 | 4/1997 | Ady et al. | 307/147 |
| 5,644,730 | 7/1997 | Fayfield | 395/282 |
| 5,664,118 | 9/1997 | Nishigaki et al. | 395/283 |
| 5,664,119 | 9/1997 | Jeffries et al. | 710/103 |
| 5,764,926 | 6/1998 | Fuduka et al. | 395/283 |
| 5,796,185 | 8/1998 | Takata et al. | 307/140 |
| 5,805,903 | 9/1998 | Elkhoury | 713/300 |
| 5,862,350 | 1/1999 | Couslon | 395/283 |
| 5,881,251 | 3/1999 | Fung et al. | 395/283 |
| 5,898,844 | 4/1999 | Thompson | 710/103 |
| 5,983,298 | 11/1999 | Schultz et al. | 710/103 |

*Primary Examiner*—Glenn A. Auve
*Assistant Examiner*—Raymond N Phan
*Attorney, Agent, or Firm*—Park & Vaughan LLP

[57] ABSTRACT

One embodiment of the present invention provides an apparatus for removing signals and power from a bus card in a computer system when the bus card is inadvertently removed from the computer system while the computer system is operating. This apparatus includes a bus connector, for receiving a bus card, and a power conductor to provide an electrical coupling between the bus card and a power source. The apparatus also includes a power switch coupled between the power conductor and the bus connector, to selectively provide power to a bus card in the bus connector. The apparatus additionally includes a movement sensor, for sensing a movement of the bus card from the bus connector. The apparatus also includes a controller coupled between the movement sensor and the power switch, for activating the power switch to remove power from the bus card when the movement sensor detects a movement of the bus card from the bus connector. The present invention can thereby prevent damage or failure of the computer system when a bus card is inadvertently removed from the computer system by powering down the bus card and/or removing signals from the bus card before it is completely removed.

16 Claims, 5 Drawing Sheets

APPARATUS FOR SENSING MOVEMENT OF A BUS CARD AND AUTOMATICALLY REMOVING POWER FROM THE BUS CARD

The subject matter of this application is related to the subject matter in patent application Ser. No. 09/093,481, filed Jun. 8, 1998, pending.

BACKGROUND

1. Field of the Invention

The present invention relates to fault tolerance in computer systems, and more particularly to a system for removing power and signals from a bus card that is inadvertently removed from a computer system during a "hot swap" operation while the computer system is running.

2. Related Art

The demand for reliability in computer systems has led to the development of computer systems that support "hot swapping" of bus cards. This allows a computer system to continue operating while a bus card is removed from the computer system, and while a new bus card is inserted into the computer system. In this way, failed system components located on bus cards can be replaced without shutting down the computer system. The other bus cards in the computer system can continue to function while the defective bus card is being replaced.

Existing hot swapping systems typically use software routines to remove power from a bus slot before a bus card is removed from the bus slot. A similar software routine is used to "power up" a new bus card after the new bus card is inserted into the bus slot. These power removal and power up functions prevent the bus card and the computer system from being damaged when the bus card is removed and/or replaced.

However, hot swapping can lead to other problems. If a computer system operator is not careful during the hot swapping process, the computer system operator may inadvertently remove the wrong bus card. This is an easy mistake to make because bus cards are typically packed close together and are often similar or identical in appearance. In order to guard against inadvertent removal, the computer system operator must take special care to power down the proper bus card, and to properly identify the powered down bus card for removal.

Some existing systems provide light emitting diodes (LEDs) near each bus card to indicate whether or not the bus card is receiving power. By examining these diodes, the computer system operator can locate the proper card to remove. However, these LEDs are often a number of inches from their corresponding bus card connectors, and the bus cards are often packed very closely together. Consequently, an operator can still easily remove the wrong bus card during the hot swapping process, in spite of the presence of the LEDs.

Removal of the bus card while the computer system is operating can have serious consequences. At a minimum, the system is likely to "hang" while waiting on an uncompleted bus transaction involving the removed bus card. At worst, removal of the bus card from an operating computer system can cause damage to the computer system and/or the bus card.

What is needed is a mechanism that removes power and signals from a bus card before the bus card can be inadvertently removed from a computer system.

SUMMARY

One embodiment of the present invention provides an apparatus for removing power from a bus card in a computer system when the bus card is inadvertently removed from the computer system while the computer system is operating. This apparatus includes a bus connector, for receiving a bus card, and a power conductor to provide an electrical coupling between the bus card and a power source. The apparatus also includes a power switch coupled between the power conductor and the bus connector, to selectively provide power to a bus card in the bus connector. The apparatus additionally includes a movement sensor, for sensing a movement of the bus card from the bus connector. The apparatus also includes a controller coupled between the movement sensor and the power switch, for activating the power switch to remove power from the bus card when the movement sensor detects a movement of the bus card from the bus connector. The present invention can thereby prevent damage or failure of the computer system when a bus card is inadvertently removed from the computer system by powering down the bus card and/or removing signals from the bus card before it is completely removed.

In one embodiment of the present invention, the movement sensor includes a mechanical switch that is activated by the bus card when the bus card is mounted in the bus connector. In another embodiment, the movement sensor includes an optical switch. In yet another embodiment, the bus connector includes a slot to receive the bus card, and the movement sensor includes a switch located inside the slot at a furthest insertion distance of the bus card into the slot. In a further embodiment, the movement sensor includes a switch located outside of the bus connector. This switch is oriented so that the switch is activated by the bus card when the bus card is mounted in the bus connector. In another embodiment, the movement sensor includes two switches located at opposing ends of the bus connector.

In another embodiment of the present invention, the controller is configured to detect an insertion of the bus card into the bus connector by monitoring the movement sensor, and to reset the bus card upon detection of the insertion. In a variation on this embodiment, the controller is configured to reset the bus card to an initial state. In another variation, the controller is configured to save state from the bus card to the computer system before removing power from the bus card, and to reset the bus card by restoring the state from the computer system to the bus card.

In another embodiment of the present invention, the controller is configured to wait until a bus transaction involving the bus card completes before removing power from the bus card. In another embodiment, the controller is configured to wait until the computer system completes a task involving the bus card before removing power.

One embodiment of the present invention includes an inrush limiter, coupled between the power conductor and the bus connector, to limit rapid inflows of current from the power conductor into a bus card in the bus connector. Another embodiment includes isolation buffers coupled between signal lines in the bus connector and the computer system for isolating the computer system from the bus card, when power is removed from the bus card.

DEFINITIONS

Bus Card—any type of removable computer system module in a computer system.

Bus Connector—an interface for coupling a bus card into a computer system, sometimes referred to as a bus slot. A bus connector typically includes electrical contacts for electrically coupling the bus card to the computer system.

Computer System Task—a unit of work performed by a central processing unit in a computer system. A task may include from one to many thousands of central processing unit instructions.

Optical Switch—an apparatus including an optical sensor that triggers an electrical relay when light shines on the optical sensor or is removed from the optical sensor.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of Computer System

Figure 1:
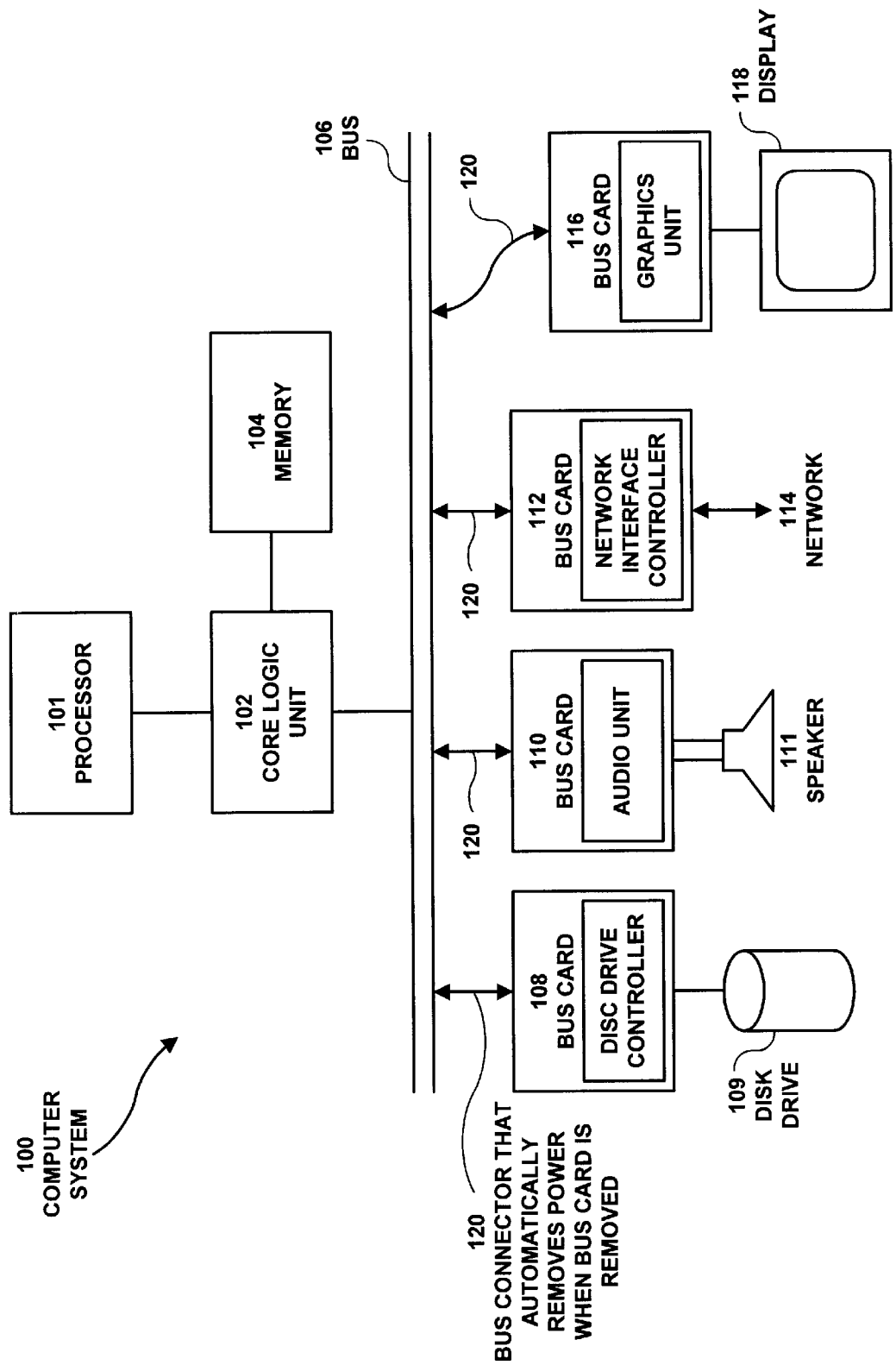
FIG. 1 illustrates a computer system 100 including a bus connector 120 that automatically removes power from a bus card when the bus card is removed from the computer system in accordance with an embodiment of the present invention.

FIG. 1 illustrates a computer system 100 including a bus connector 120 that automatically removes power from a bus card when the bus card is removed from the computer system in accordance with an embodiment of the present invention. In this embodiment, computer system 100 includes processor 101, which is coupled to core logic unit 102. Core logic unit 102 is additionally coupled to memory 104, and bus 106. Processor 101 may be any type of processor that can be used in a computing system. This includes, but is not limited to, microprocessors, mainframe processors, and device controllers. Core logic unit 102 includes circuitry to couple processor 101 to memory 104 and to bus 122. Memory 104 is any type of random access memory that can be used to store code and data for processor 101.

In this embodiment, processor 101 can communicate with additional computer system components across bus 106. These components are located on bus cards 108, 110, 112 and 116. Bus card 108 includes a disk drive controller and is coupled to a disk drive 109. Disk drive 109 can include any type of nonvolatile storage device for storing code and data used by processor 101. Bus card 110 includes an audio unit that processes audio signals from the computer system for output through speaker 111. Bus card 112 includes a network interface controller, which can include any type of interface to a computer network 114. Bus card 116 includes a graphics unit including graphics processing hardware. Bus card 116 is coupled to display 118, which can include any type of display that can be used with a computer system. This includes, but is not limited to, a graphical display on a cathode ray tube or a flat panel LCD.

In this embodiment, each of bus cards 108, 110, 112 and 116 are coupled to bus 106 through a separate bus connectors 120. Bus connectors 120 are designed so that power is removed from a bus connector 120 when a bus card located in the bus connector 120 is removed from computer system 100 while computer system 100 operating.

Description of Bus Connector

Figure 2:
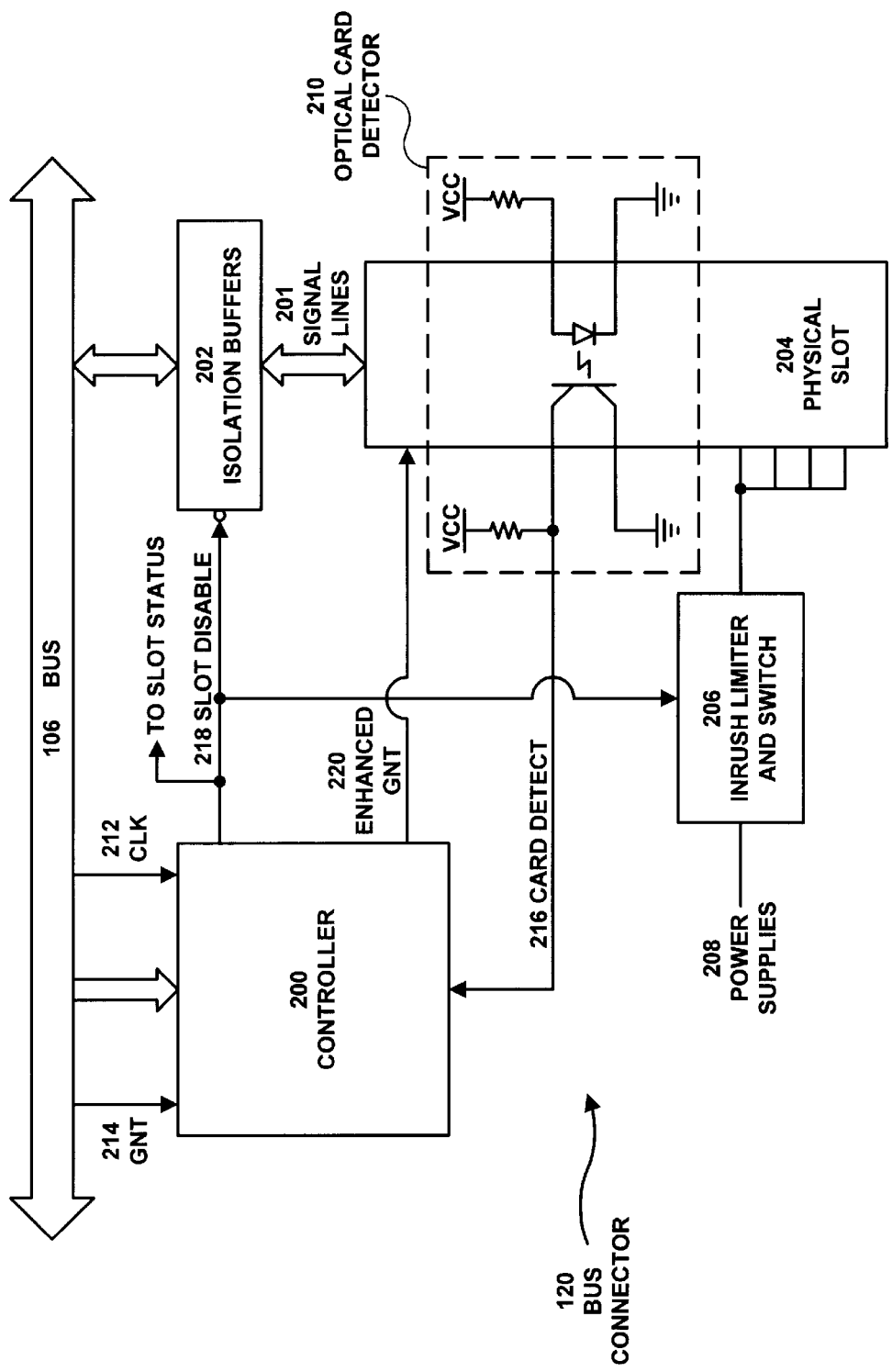
FIG. 2 illustrates part of the internal structure of a bus connector 120 from FIG. 1 in accordance with an embodiment of the present invention.

FIG. 2 illustrates part of the internal structure of a bus connector 120 in accordance with an embodiment of the present invention. Bus connector 120 includes a physical slot 204 with signal lines 201 coupled to bus 106 through isolation buffers 202. Physical slot 204 is coupled to power supplies 208 through inrush limiter and switch 206. Controller 200 is coupled to bus 106, isolation buffers 202, physical slot 204 and inrush limiter and switch 206. Bus 106 may be any type of computer system bus 106, including a bus designed according to the PCI standard.

In this embodiment, a number of signal lines from bus 106 feed into controller 200. These include GNT signal 214 and CLK signal 212, which are bus grant and clock signals specified under the PCI bus standard. Controller 200 additionally receives card detect signal 216 from optical card detector 210 within physical slot 204. Card detect signal 216 is asserted when a bus card is inserted into physical slot 204 causing optical card detector 210 to detect the presence of the card. In this embodiment, optical card detector includes a light emitting diode (LED) which shines onto an optical detector when no bus card is present in physical slot 204. Light from the LED is blocked from the optical sensor when a bus card is inserted into physical slot 204 so that the bus card is interposed between the LED and the optical sensor. Other embodiments use mechanical switches to detect the presence or absence of a bus card from physical slot 204.

Controller 200 generates an enhanced GNT signal 220 and a slot disable signal 218. In this embodiment, enhanced GNT signal 220 is asserted whenever GNT signal 214 from bus 106 is asserted and card detect signal 216 is asserted. Enhanced GNT signal 220 is a modified grant signal for a card in physical slot 204. Enhanced GNT signal 220 is active only when a card is detected in physical slot 204. Slot disable signal 218 feeds into isolation buffers 202 and inrush limiter and switch 206. Slot disable signal 218 causes isolation buffers 202 to isolate signal lines 201 from bus 106. In one embodiment, isolation buffers 202 are implemented as pass transistors. In response to slot disable signal 218, inrush limiter and switch 206 cause power supplies 208 to be decoupled from physical slot 204. Inrush limiter and switch 206 additionally limits a surge of current into physical slot 204.

During operation of the system in FIG. 2, optical card detector 210 detects a movement of a bus card from physical slot 204, and changes card detect signal 216. Before the bus card is fully disengaged from physical slot 204, controller 200 responds to the movement by asserting slot disable signal 218, which causes isolation buffers 202 to isolate signal lines 201 from bus 106, and causes inrush limiter and switch 206 to remove power from physical slot 204. In a variation on this embodiment, slot disable signal 218 is delayed so that computer system 100 (from FIG. 1) can complete a bus transaction or a task involving a card in physical slot 204. Additionally, when no card is detected in physical slot 204, enhanced GNT signal 220 is disabled. Note that computer system 100 can determine whether physical slot 204 is disabled by reading slot status from bus 106.

Description of Bus Connector Controller

Figure 3:
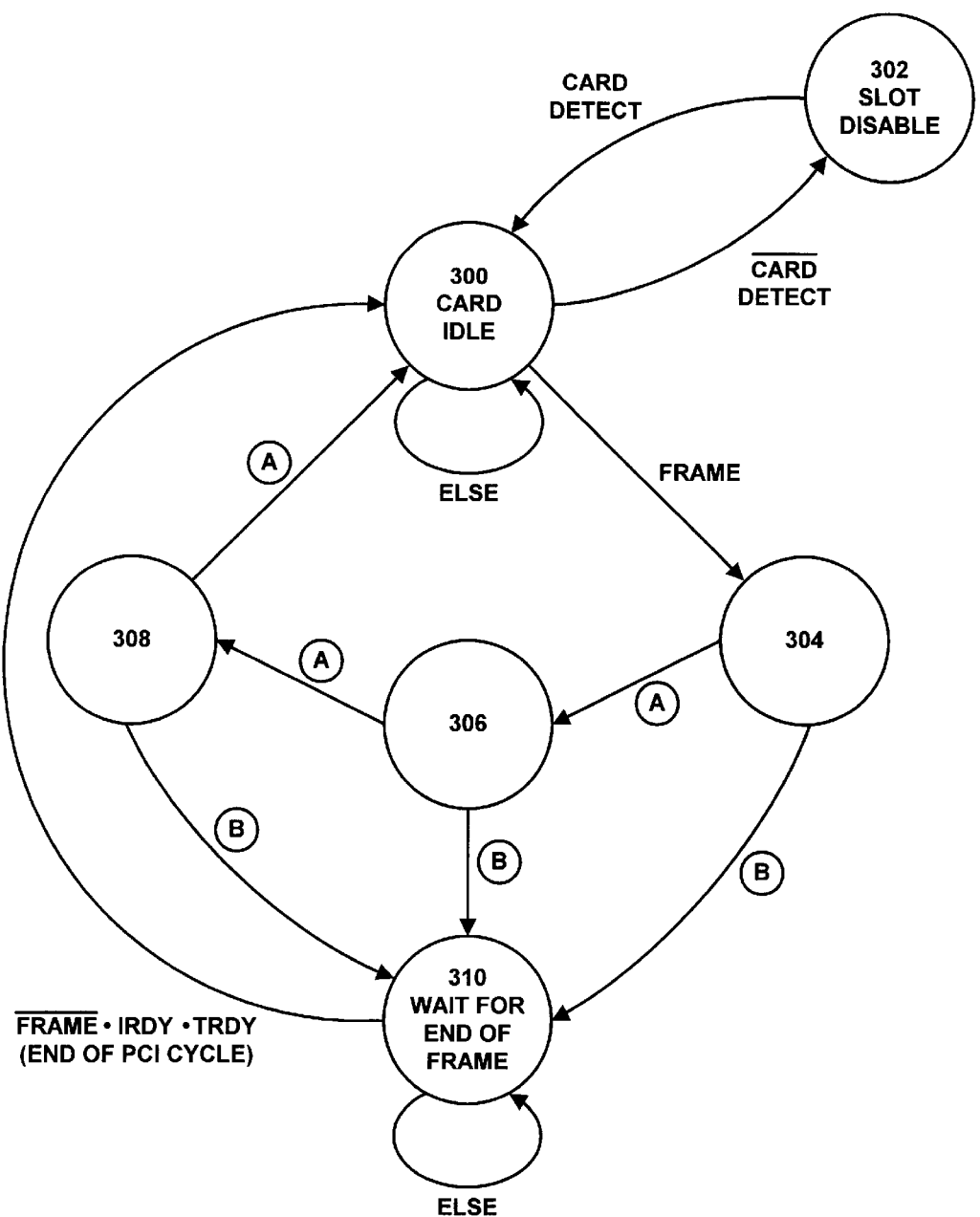
FIG. 3 is a state diagram illustrating the operation of controller 200 from FIG. 2 in accordance with an embodiment of the present invention.

FIG. 3 is a state diagram illustrating the operation of controller 200 from FIG. 2 in accordance with an embodiment of the present invention. In this embodiment, controller 200 takes as input a number of transaction control signals from a bus 106 that conforms to the PCI standard. These signals include: FRAME, IRDY, TRDY, GNT, IDSEL and DEVSEL. The FRAME signal is driven by the current bus initiator and indicates the start and duration of a bus transaction. The IRDY signal is driven by the current bus master. During a write, IRDY being asserted indicates that the initiator is driving valid data onto the bus. During a read, IRDY being asserted indicates that the initiator is ready to accept data from the currently addressed target. The TRDY signal is driven by the currently addressed target on the bus. It is asserted when the target is ready to complete the current data transfer. GNT is asserted when the arbiter has determined that the requesting master should be granted control of the PCI bus. In doing so, the arbiter asserts a GNT line specific to the requesting master. The IDSEL signal is an input to a PCI device that is used as a chip select during an access to one of the device's configuration registers. The DEVSEL signal is asserted by the target when the target has decoded its address. The state machine additionally receives card detect signal 216 from optical card detector 210 from FIG. 1.

Assume the state machine in FIG. 3 starts in state 300. In state 300 the bus card is idle. If card detect signal 216 is de-asserted, this indicates that the card is being removed from its bus connector; the system proceeds to state 302. If a FRAME signal is detected, indicating a bus transaction is taking place, the system proceeds to state 304. Otherwise, the system remains in state 300.

In state 302, the slot disable signal is asserted, causing power to be removed from physical slot 204 (from FIG. 2), and causing isolation buffers 202 to decouple signal lines 201 from bus 106. If card detect signal 216 is asserted again. This indicates a card has been inserted into physical slot 204, and the system returns to state 300.

In state 304, the system looks for two conditions. Condition A occurs if GNT or IDSEL or /DEVSEL is asserted. If condition A is true, either bus control is being transferred, or a bus device is being initialized or no target has detected its address. In this case, the system proceeds to state 306. Condition B occurs if bus control is not changing, no device is being initialized and a target has decoded its address. If condition B is true, a normal bus transfer is taking place, and the system proceeds to state 310.

In state 306, the system looks for the same two conditions. If condition A is true the system proceeds to state 308. If condition B is true, the system proceeds to state 310.

In state 308, the system again looks for the same two conditions. If condition A is true, the system returns to state 300. If condition B is true, the system proceeds to state 310.

In state 310, a bus transaction is taking place. The system waits for the end of the current PCI bus cycle, which is indicated by /FRAME and IRDY and TRDY. When the end of the current cycle is detected, the system returns to state 300. Otherwise, the system remains in state 310.

The state diagram illustrated in FIG. 3 effectively causes controller 200 (from FIG. 2) to wait for a bus transaction to complete before disabling physical slot 204. This prevents the computer system from hanging while waiting for a response from a bus card when the card is disabled in the middle of a bus transaction.

Description of Sensor Locations

Figure 4:
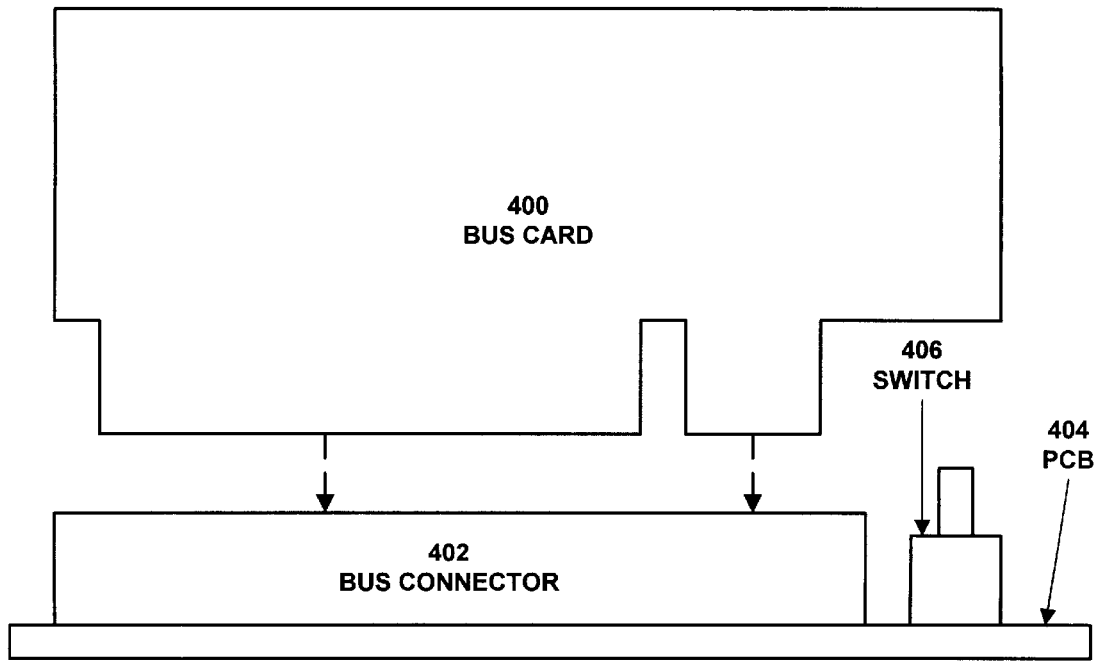
FIG. 4 illustrates an embodiment of the present invention including a mechanical switch 406 located outside of bus connector 402.

FIG. 4 illustrates an embodiment of the present invention including a mechanical switch 406 located outside of bus connector 402. In this embodiment, bus card 400 fits into bus connector 402 on printed circuit board (PCB) 404. When bus card 400 is fully inserted into bus connector 402, switch 406 is depressed, which indicates that bus card 400 is seated in bus connector 402.

Figure 5:
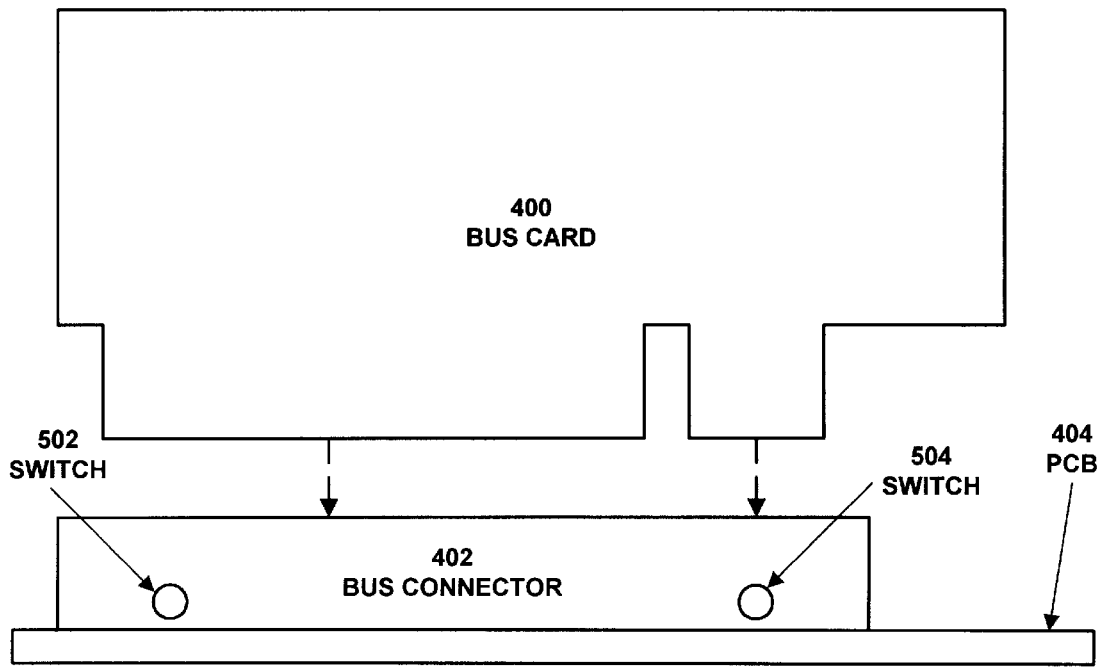
FIG. 5 illustrates an embodiment of the present invention including two switches 502 and 504 located at opposing ends of bus connector 402 in accordance with an embodiment of the present invention.

FIG. 5 illustrates an embodiment of the present invention including two switches 502 and 504 located at opposing ends of bus connector 402 in accordance with an embodiment of the present invention. In this embodiment, the two switches 502 and 504 are located inside of bus connector 402. Furthermore, switches 502 and 504 are located at a furthest insertion distance of bus card 400 into bus connector 402. This allows switches 502 and 504 to determine when bus card 400 is being moved from bus connector 402, before bus card 400 is completely removed from bus connector 402. This enables power to be removed from bus card 400 before the electrical connections from bus card 400 to bus connector 402 are completely disengaged.

Providing two switches 502 and 504 at opposing end of bus connector 402 allows the system to detect if either end of bus card 400 is disengaged from bus connector 402.

Description of Operation of System

Figure 6:
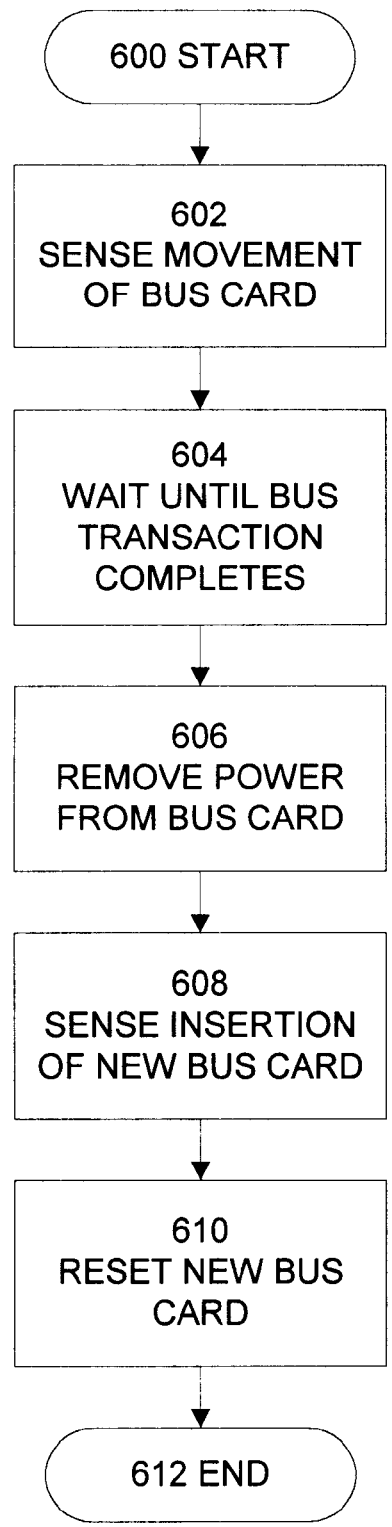
FIG. 6 is a flow chart illustrating the operation of one embodiment of the present invention.

FIG. 6 is a flow chart illustrating the operation of one embodiment of the present invention. In this embodiment, the system starts at state 600 and proceeds to state 602. In state 602, the system senses a movement of the bus card using a sensor, such as optical card detector 210 from FIG. 2. The system then proceeds to state 604. In state 604, the system waits until a bus transaction completes so that the bus card is not disabled while a bus transaction involving the bus card is in progress. Details of this waiting are described above with reference to the state diagram in FIG. 3. The system next advances to state 606. In state 606, the system removes power from the bus card. The system next advances to state 608. In state 608, the system senses insertion of a new bus card. The system next proceeds to state 610. In state 610, the new bus card is reset. The system next advances to state 612, which is an end state.

The foregoing descriptions of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. An apparatus for removing connections to a bus card in a computer system when the bus card is inadvertently removed from the computer system while the computer system is operating, comprising:

a bus connector, for receiving the bus card;

a power conductor coupled to the bus connector, to provide an electrical coupling between the bus card and a power source;

a power switch coupled between the power conductor and the bus connector, to selectively provide power to the bus card in the bus connector;

a movement sensor positioned to be in communication with the bus card when the bus card is mounted in the bus connector, for sensing a movement of the bus card from the bus connector; and a controller coupled between the movement sensor and the power switch, for activating the power switch to remove power from the bus card when the movement sensor detects the movement of the bus card from the bus connector;

wherein the controller is configured to detect an insertion of a new bus card into the bus connector by monitoring the movement sensor, and to reset the new bus card upon detection of the insertion; and wherein the controller is configured to save a state from the bus card to the computer system before removing power from the bus card, and to reset the new bus card by restoring the state from the computer system to the new bus card.

2. The apparatus of claim 1, wherein the controller is configured to wait until the computer system completes a task involving the bus card before removing power from the bus card.

3. The apparatus of claim 1, further comprising an inrush limiter coupled between the power conductor and the bus connector, to limit rapid inflows of current from the power conductor into the bus card in the bus connector.

4. The apparatus of claim 1, further comprising isolation buffers coupled between signal lines in the bus connector and the computer system for isolating the computer system from the bus card, when power is removed from the bus card.

5. The apparatus of claim 1, wherein the movement sensor includes a mechanical switch that is activated by the bus card when the bus card is mounted in the bus connector.

6. The apparatus of claim 1, wherein the movement sensor includes an optical switch that is activated by the bus card when the bus card is mounted in the bus connector.

7. The apparatus of claim 1, wherein:

the bus connector includes a slot to receive the bus card; and the movement sensor includes a switch located inside the slot at a furthest insertion distance of the bus card into the slot.

8. The apparatus of claim 1, wherein the movement sensor includes a switch located outside of the bus connector, the switch being oriented so that the switch is activated by the bus card when the bus card is mounted in the bus connector.

9. The apparatus of claim 1, wherein the movement sensor includes two switches located at opposing ends of the bus connector.

10. The apparatus of claim 1, wherein the controller is configured to detect an insertion of a new bus card into the bus connector by monitoring the movement sensor, and to reset the new bus card upon detection of the insertion.

11. An apparatus for removing connections to a bus card in a computer system when the bus card is inadvertently removed from the computer system while the computer system is operating, comprising:

a bus connector, for receiving the bus card;

a power conductor coupled to the bus connector, to provide an electrical coupling between the bus card and a power source;

a power switch coupled between the power conductor and the bus connector, to selectively provide power to the bus card in the bus connector;

a movement sensor positioned to be in communication with the bus card when the bus card is mounted in the bus connector, for sensing a movement of the bus card from the bus connector, the movement sensor including two switches located at opposing ends of the bus connector;

a controller coupled between the movement sensor and the power switch, for activating the power switch to remove power from the bus card when the movement sensor detects the movement of the bus card from the bus connector, the controller being configured to detect an insertion of a new bus card into the bus connector by monitoring the movement sensor, and to reset the new bus card upon detection of the insertion;

an inrush limiter coupled between the power conductor and the bus connector, to limit rapid inflows of current from the power conductor into the bus card in the bus connector; and isolation buffers coupled between signal lines in the bus connector and the computer system for isolating the computer system from the bus card, when power is removed from the bus card;

wherein the controller is configured to save a state from the bus card to the computer system before removing power from the bus card, and to reset the new bus card by restoring the state from the computer system to the new bus card.

12. The apparatus of claim 11, wherein the controller is configured to wait until the computer system completes a task involving the bus card before removing power from the bus card.

13. The apparatus of claim 11, wherein:

the bus connector includes a slot to receive the bus card; and the movement sensor includes a switch located inside the slot at a furthest insertion distance of the bus card into the slot.

14. The apparatus of claim 11, wherein the controller is configured to reset the new bus card to an initial state.

15. The apparatus of claim 9, wherein the controller is configured to reset the new bus card to an initial state.

16. The apparatus of claim 11, wherein the movement sensor includes an optical switch that is activated by the bus card when the bus card is mounted in the bus connector.

* * * * *